United States Patent
Fujimori et al.

(10) Patent No.: US 10,319,496 B2
(45) Date of Patent: Jun. 11, 2019

(54) INSULATED WIRE AND ROTATING ELECTRICAL MACHINE

(71) Applicants: FURUKAWA ELECTRIC CO., LTD., Tokyo (JP); FURUKAWA MAGNET WIRE CO., LTD., Tokyo (JP)

(72) Inventors: Kenji Fujimori, Tokyo (JP); Makoto Oya, Tokyo (JP); Ryosuke Obika, Tokyo (JP)

(73) Assignees: FURUKAWA ELECTRIC CO., LTD., Tokyo (JP); FURUKAWA MAGNET WIRE CO., LTD., Tokyo (JP)

( * ) Notice: Subject to any disclaimer, the term of this patent is extended or adjusted under 35 U.S.C. 154(b) by 0 days.

(21) Appl. No.: 15/587,707

(22) Filed: May 5, 2017

(65) Prior Publication Data

US 2017/0236618 A1    Aug. 17, 2017

Related U.S. Application Data

(63) Continuation of application No. PCT/JP2015/081074, filed on Nov. 4, 2015.

(30) Foreign Application Priority Data

Nov. 7, 2014   (JP) ................. 2014-227585

(51) Int. Cl.
   *H01B 7/02*   (2006.01)
   *H01B 3/30*   (2006.01)
   (Continued)

(52) U.S. Cl.
   CPC ........... *H01B 7/02* (2013.01); *C08J 9/142* (2013.01); *C09D 179/08* (2013.01); *H01B 3/303* (2013.01);
   (Continued)

(58) Field of Classification Search
   CPC .................. H01B 7/02; C09J 9/142
   See application file for complete search history.

(56) References Cited

U.S. PATENT DOCUMENTS

| 2010/0212928 A1* | 8/2010 | Abe | H01B 3/308 |
| | | | 174/110 R |
| 2013/0014971 A1* | 1/2013 | Muto | H01B 3/301 |
| | | | 174/110 SR |
| 2016/0055940 A1 | 2/2016 | Oya et al. | |

FOREIGN PATENT DOCUMENTS

| JP | 2001-291432 A | 10/2001 |
| JP | 2001291432 A * | 10/2001 |

(Continued)

OTHER PUBLICATIONS

International Search Report, issued in PCT/JP2015/081074, dated Dec. 22, 2015.

(Continued)

*Primary Examiner* — Hoa C Nguyen
*Assistant Examiner* — Amol H Patel
(74) *Attorney, Agent, or Firm* — Birch, Stewart, Kolasch & Birch, LLP

(57) ABSTRACT

An insulated wire, having at least one foamed insulating layer composed of a thermosetting resin having bubbles, directly or indirectly on an outer periphery of a conductor, wherein the foamed insulating layer has a different bubble density in a thickness direction thereof; and a rotating electrical machine.

5 Claims, 3 Drawing Sheets

(51) Int. Cl.
  *C09D 179/08* (2006.01)
  *C08J 9/14* (2006.01)
  *H02K 11/33* (2016.01)
  *H02K 3/30* (2006.01)
  *H01F 5/06* (2006.01)
  *H01B 7/00* (2006.01)

(52) U.S. Cl.
  CPC ............... *H01B 3/306* (2013.01); *H01B 7/00* (2013.01); *H01F 5/06* (2013.01); *H02K 3/30* (2013.01); *H02K 11/33* (2016.01); *C08J 2201/0502* (2013.01); *C08J 2203/182* (2013.01); *C08J 2207/06* (2013.01); *C08J 2379/08* (2013.01)

(56) References Cited

FOREIGN PATENT DOCUMENTS

| | | |
|---|---|---|
| JP | 2007-35417 A | 2/2007 |
| JP | 2007-188742 A | 7/2007 |
| WO | WO 2014/175266 A1 | 10/2014 |

OTHER PUBLICATIONS

Written Opinion of the International Searching Authority (PCT/ISA/237), issued in PCT/JP2015/081074, dated Dec. 22, 2015.

\* cited by examiner

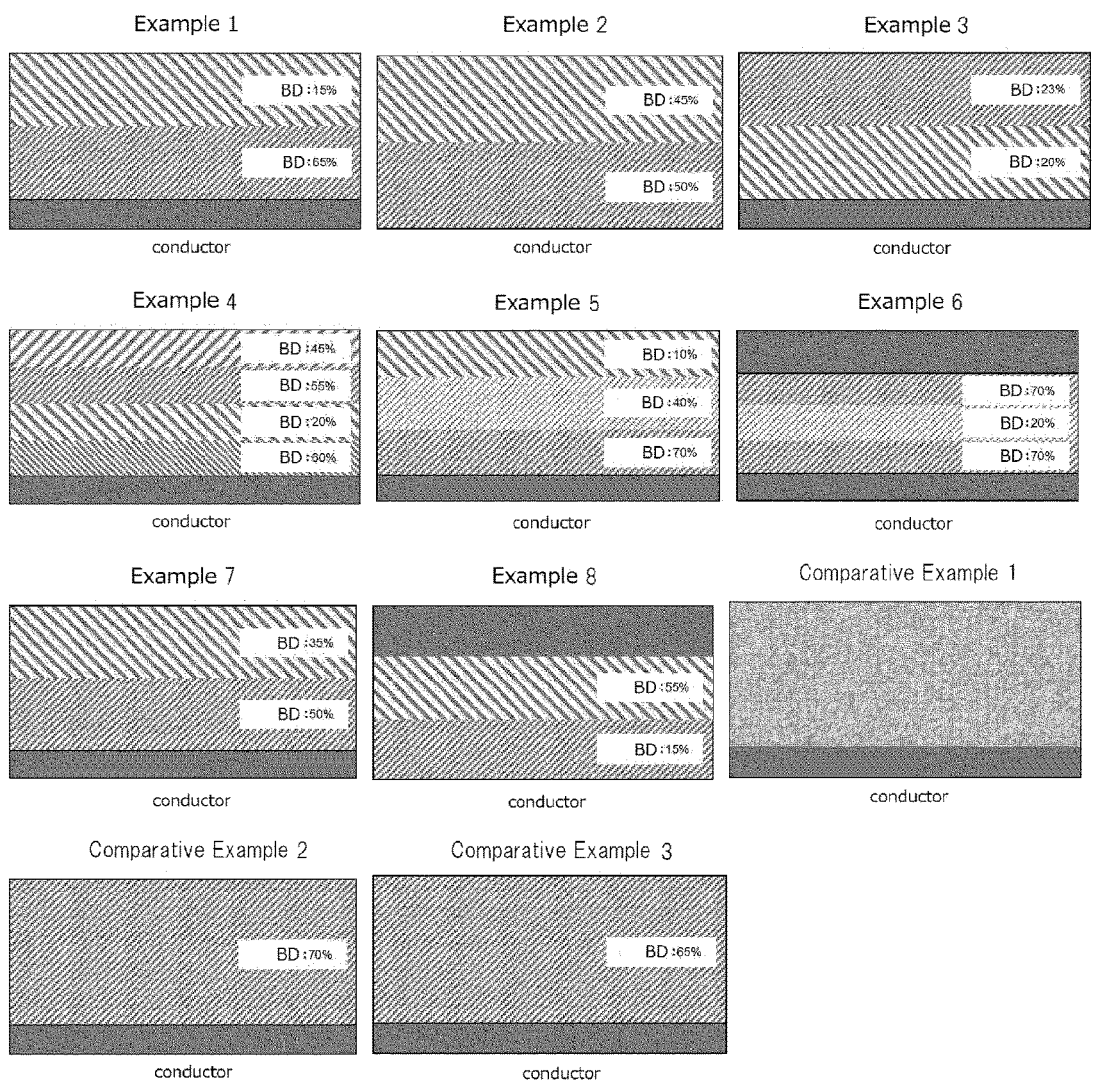

1

INSULATED WIRE AND ROTATING ELECTRICAL MACHINE

CROSS-REFERENCE TO RELATED APPLICATIONS

This application is a Continuation of PCT International Application No. PCT/JP2015/081074 filed on Nov. 4, 2015, which claims priority under 35 U.S.C. § 119 (a) to Japanese Patent Application No. 2014-227585 filed in Japan on Nov. 7, 2014. Each of the above applications is hereby expressly incorporated by reference, in its entirety, into the present application.

TECHNICAL FIELD

The present invention relates to an insulated wire and a rotating electrical machine.

BACKGROUND ART

Inverters have become installed in many types of electrical equipment, as efficient variable-speed control units. However, inverters are switched at a frequency of several kHz to several ten kHz, to cause a surge voltage at every pulse thereof. Such an inverter surge occurs reflection at a breakpoint of impedance, for example, at a starting end, a termination end, or the like of a connected wire, in the propagation system, and consequently, to apply a voltage twice as high as the inverter output voltage at the maximum. In particular, an output pulse occurred due to a high-speed switching device, such as an insulated gate bipolar transistor (IGBT), is high in steep voltage rise. Accordingly, even if a connection cable is short, the surge voltage is high, and voltage decay due to the connection cable is also low. As a result, a voltage almost twice as high as the inverter output voltage occurs.

As coils for electrical equipments, such as inverter-related equipments, for example, high-speed switching devices, inverter motors, and transformers, use is made of insulated wires, which are mainly enameled wires, as magnet wires in the coils. Further, as described above, since a voltage almost twice as high as the inverter output voltage is applied to in inverter-related equipments, it becomes required in insulated wires to have minimized partial discharge deterioration due to the inverter surge.

In general, the partial discharge deterioration refers to a phenomenon in which an electric insulating material complexly receives: molecular chain scission deterioration, caused by collision with charged particles that have been generated by the partial discharge of the electric insulating material (discharge at a portion in which fine void defect and the like exist); sputtering deterioration; thermal fusion or thermal decomposition deterioration, caused by local temperature rise; chemical deterioration, caused by ozone generated due to discharge; or the like. Thus, thickness is lowered, in several cases, in the electric insulating materials which actually have been deteriorated by the partial discharge.

Like the case where the relative dielectric constant of almost resins which are ordinarily used as a material of the insulating layer exists between 3 and 4, there is no material whose relative dielectric constant is particularly low. Further, in practice, taking, into account, other characteristics to be required for the insulating layer (flexibility, heat resistance, solvent resistance, and the like), consistently a material, whose relative dielectric constant is low, cannot be always selected.

Recently, it is required to increase particularly a ratio (space factor) of the conductor cross-sectional area to the stator slot cross-sectional area. In view of this required characteristic, excellent flexibility is required for the insulated wire.

In addition to this, a working frequency of the electrical equipment coil is expanding to a GHz region. The higher the working frequency is, the larger the dielectric loss of an insulator portion of the insulated wire becomes. For lowering in dielectric characteristics or improvement in transmission characteristics, with a provision of a plurality of foamed insulating layers composed of thermoplastic resins, a means of making the foam density of the foamed insulating layer at a center conductor side to be higher is proposed (see Patent Literature 1), or a means of adjusting a foam density of the outer foamed insulating layer to the extent of 30 to 60% is proposed (see Patent Literature 2).

CITATION LIST

Patent Literatures

Patent Literature 1: JP-A-2007-035417 ("JP-A" means unexamined published Japanese patent application)
Patent Literature 2: JP-A-2007-188742

SUMMARY OF INVENTION

Technical Problem

In view of the above situation, the present invention addresses the above problems, by using, as a resin for forming a foamed insulating layer, a thermosetting resin which is excellent in heat resistance, mechanical strength, creep resistance, and solvent resistance. Thus, the present invention is contemplated for providing an insulated wire exhibiting more excellent performances than the conventional ones. In particular, in a related art, although a high partial discharge inception voltage can be achieved, it was difficult to achieve a balance between the partial discharge inception voltage and an extremely excellent flexibility which withstands a winding process which becomes more and more intense.

In other words, the present invention is contemplated for providing an insulated wire, which exhibits both high partial discharge inception voltage and high dielectric breakdown voltage and, which is excellent in flexibility and abrasion resistance. Further, the present invention is contemplated for providing a rotating electrical machine using the insulated wire exhibiting such excellent performances.

Solution to Problem

That is, the present invention provides the following means:
(1) An insulated wire, comprising at least one foamed insulating layer composed of a thermosetting resin having bubbles, directly or indirectly on an outer periphery of a conductor, wherein the foamed insulating layer has a different bubble density in a thickness direction thereof.
(2) The insulated wire as described in the item (1), wherein a difference of the bubble density in the thickness direction of the foamed insulating layer is 3% or more.

(3) The insulated wire as described in the item (1) or (2), wherein an average bubble diameter in the foamed insulating layer is 10 μm or less.
(4) The insulated wire as described in any one of the items (1) to (3), wherein a thickness of the foamed insulating layer is from 10 to 200 μm.
(5) The insulated wire as described in any one of the items (1) to (4), wherein the thermosetting resin is selected from a polyamideimide resin, a polyimide resin, a polyamide resin, a polyetherimide resin, a polyesterimide resin, and a polyethersulfone resin.
(6) A rotating electrical machine comprising the insulated wire as described in any one of the items (1) to (5).

In the present invention, the bubble means a void having a diameter of 0.1 μm or more, or a void caused by foaming. The foamed layer means a layer containing 5 or more bubbles per area of 1×1 square, provided that the thickness of one layer is 1.

Herein, in the present invention, the different layer refers to not only layers in which a resin is different from each other, but also the layers in which even though the resin is the same, a foamed layer having bubbles and a non-foamed layer having no bubbles are different layers from each other.

Further, in the case of using a thermosetting resin, and in the non-foamed layer having no bubbles, layers whose thicknesses are simply adjusted by repeatedly coating and baking the same resin varnish, are the same layers.

On the other hand, in the case of the foamed layer, despite layers whose bubble densities are different in the thickness direction, are composed of the same resin, the layers are the same layers. Even though a resin varnish is coated and baked repeatedly in order to adjust a thickness or to change simply a foam density, if at least a resin is the same, the layers are the same layers. For example, in the case where baking conditions are changed after coating with the same resin varnish, and in the case where a resin in resin varnishes is the same, and the coating and the baking are repeated using the resin varnishes in which only a kind and an amount of a foaming agent for changing a foam density are different, the resultant layers are each the same layers, in other words, one layer.

Note that, whether or not the resins in use are different from each other can be determined by analysis of infrared absorption spectra or Raman spectra. Further, whether or not the resin has bubbles can be determined by observation (photographing) of the cross-section in the thickness direction at 300- to 3,000-fold magnification with a scanning electron microscopy (SEM).

Advantageous Effects of Invention

The present invention allowed providing an insulated wire, which exhibits both high partial discharge inception voltage and high dielectric breakdown voltage and, which are excellent in flexibility and abrasion resistance. Further, according to the present invention, there can be provided a rotating electrical machine, employing the insulated wire exhibiting such excellent performances.

Other and further features and advantages of the invention will appear more fully from the following description, appropriately referring to the accompanying drawings.

BRIEF DESCRIPTION OF THE DRAWINGS

FIG. 6 is schematic diagrams showing a difference in the bubble densities of each sample in Examples.

MODE FOR CARRYING OUT THE INVENTION

Figure 1A:
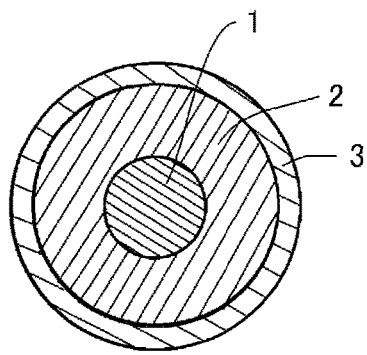
FIG. 1(a) is a cross-sectional view showing an embodiment of the insulated wire of the present invention.

Hereinafter, the insulated wire of the present invention will be explained.
<<Insulated Wire>>

The insulated wire (also called as an insulated electric wire) of the present invention has at least one foamed insulating layer composed of a thermosetting resin having bubbles, directly or indirectly on the outer periphery of a conductor, wherein the foamed insulating layer has a different bubble density in the thickness direction thereof.

In the present invention, an inner insulating layer composed of a thermosetting resin may be interposed between a conductor and a foamed insulating layer composed of a thermosetting resin, or an outer insulating layer composed of a thermoplastic resin may be provided at the outer side of the foamed insulating layer composed of the thermosetting resin. Further, an outer insulating layer may be provided, at the outer side of the foamed insulating layer composed of the thermosetting resin, through an interior insulating layer.

Note that, the inner insulating layer is a layer which is formed on the outer periphery of the conductor and which is formed in the state of having no bubbles by a thermosetting resin which forms the foamed insulating layer as described below. Further, the interior insulating layer is a layer which is formed at the interior portion of the foamed insulating layer in the state of having no bubbles by a thermosetting resin which forms the foamed insulating layer as described below. In the present invention, an inner insulating layer or an interior insulating layer may be provided as needed.

A total thickness of the coated film of the electric wire in the cross-section perpendicular to a longitudinal direction of the insulated wire (a total of thicknesses of all insulating layers; a total thickness up to the surface above the conductor) is preferably from 20 to 300 μm and more preferably from 50 to 200 μm.

Hereinafter, the insulated wire having the conductor, the foamed insulating layer composed of the thermosetting resin, and the outer insulating layer composed of the thermoplastic resin, will be explained as an example with reference to drawings.

However, the present invention is not limited to those shown in the drawings.

An embodiment of the insulated wire of the present invention whose cross-sectional view is shown in FIG. 1(a)

has: the conductor 1 whose cross-section is round; the foamed insulating layer 2 composed of the thermosetting resin and having a different bubble density in the thickness direction thereof, which coats the outer periphery of the conductor 1; and the outer insulating layer 3 composed of the thermoplastic resin, which coats the outer periphery of the foamed insulating layer 2. In this embodiment, the cross-sections of the foamed insulating layer 2 and the outer insulating layer 3 are also round.

Figure 1B:
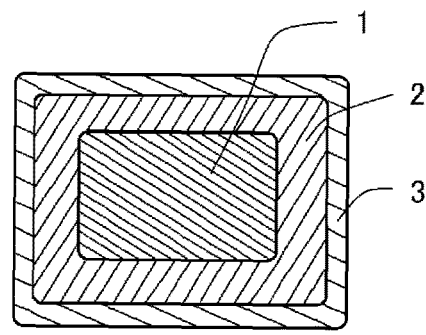
FIG. 1(b) is a cross-sectional view showing another embodiment of the insulated wire of the present invention.

Another embodiment of the insulated wire of the present invention whose cross-sectional view is shown in FIG. 1(*b*) utilizes the conductor whose cross-section is rectangular as the conductor 1 and is basically the same as the insulated wire shown in FIG. 1(*a*), except for the above matter. In this embodiment, as the cross-section of the conductor 1 is rectangular, the cross-sections of the foamed insulating layer 2 composed of the thermosetting resin and the outer insulating layer 3 composed of the thermoplastic resin are also rectangular.

Figure 2A:
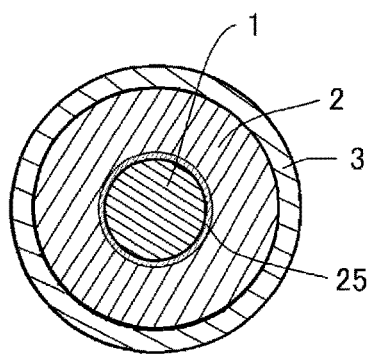
FIG. 2(a) is a cross-sectional view showing still another embodiment of the insulated wire of the present invention.
Figure 2B:
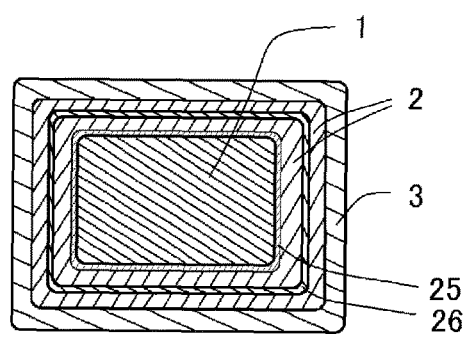
FIG. 2(b) is a cross-sectional view showing further another embodiment of the insulated wire of the present invention.

Still another embodiment of the insulated wire of the present invention whose cross-sectional view is shown in FIG. 2(*a*) is the same as the insulated wire shown in FIG. 1(*a*), except that the inner insulating layer 25 composed of the thermosetting resin is provided, at the inside of the foamed insulating layer 2 composed of the thermosetting resin having bubbles and having a different bubble density in the thickness direction thereof and, on the outer periphery of the conductor 1.

Further another embodiment of the insulated wire of the present invention whose cross-sectional view is shown in FIG. 2(*b*) is the same as the insulated wire shown in FIG. 2(*a*), except that the interior insulating layer 26, which divides the foamed insulating layer 2 into 2 layers in the thickness direction, is provided, and the conductor whose cross-section is rectangular is used as the conductor 1. In other words, in this embodiment, the inner insulating layer 25, the foamed insulating layer 2, the interior insulating layer 26, the foamed insulating layer 2, and the outer insulating layer 3 are formed so as to be stacked in this order, on the conductor 1.

In the present invention, the term "the inner insulating layer" is basically the same as the foamed insulating layer, except for having no bubbles, and the term "the interior insulating layer" is basically the same as the inner insulating layer, except for the location to be formed.

Figure 3A:
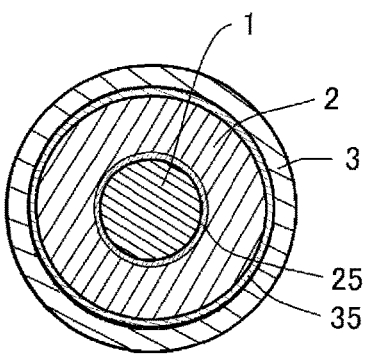
FIG. 3(a) is a cross-sectional view showing yet another embodiment of the insulated wire of the present invention.
Figure 3B:
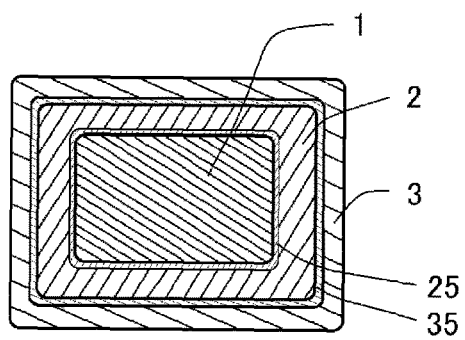
FIG. 3(b) is a cross-sectional view showing further yet another embodiment of the insulated wire of the present invention.

Yet another embodiment of the insulated wire of the present invention whose cross-sectional view is shown in FIG. 3(*a*) is the same as the insulated wire shown in FIG. 2(*a*), except that the interior insulating layer 35, such as an adhesion layer, is interposed between the foamed insulating layer 2 composed of the thermosetting resin having bubbles and the outer insulating layer 3.

Further yet another embodiment of the insulated wire of the present invention whose cross-sectional view is shown in FIG. 3(*b*) is the same as the insulated wire shown in FIG. 2(*b*), except that the interior insulating layer 35, such as an adhesion layer, is provided between the foamed insulating layer 2 composed of the thermosetting resin having bubbles and having a different bubble density in the thickness direction thereof and the outer insulating layer 3, in place of the interior insulating layer 26 in FIG. 2(*b*).

<Conductor>

As the conductor 1 that can be used in the present invention, use may be made of any conductor that is usually used in insulated wires, and examples thereof include a conductor made, for example, of: copper, a copper alloy, aluminum, an aluminum alloy, or a combination thereof. The conductor is a conductor of preferably a low-oxygen copper whose oxygen content is 30 ppm or less, and more preferably a low-oxygen copper whose oxygen content is 20 ppm or less or an oxygen-free copper. When the conductor is melted by heat for the purpose of welding if the oxygen content is 30 ppm or less, voids caused by contained oxygen are not occurred at a welded portion, the deterioration of the electrical resistance of the welded portion can be prevented, and the strength of the welded portion can be secured.

A conductor 1 that can be used in the present invention is the conductor whose cross-sectional shape may be any of round (circular), quadrilateral (rectangular), or hexagonal. The rectangular conductor 1 has higher space factor with respect to the stator slot at the time of winding, compared to a round conductor, which is preferable.

The size of the rectangular conductor 1 is not particularly limited, but the width (long side) thereof is preferably from 1 to 5 mm, and more preferably from 1.4 to 4.0 mm, and the thickness (short side) is preferably from 0.4 to 3.0 mm, and more preferably from 0.5 to 2.5 mm. The ratio of length of the width (long side) and the thickness (short side) is preferably from 1:1 to 1:4.

Further, the rectangular conductor 1 has preferably such a shape that chamfered corners (curvature radius r) are provided at four corners. The curvature radius r is preferably 0.6 mm or less and more preferably in a range from 0.2 to 0.4 mm.

In the case of the conductor 1 in which the cross section is round, a size is not particularly limited, but a diameter is preferably 0.3 to 3.0 mm, and more preferably 0.4 to 2.7 mm.

<Foamed Insulating Layer>

The thickness of the foamed insulating layer is not particularly limited, but is preferably from 10 to 200 µm in the present invention.

Further, in the present invention, the foamed insulating layer may be composed of 1 layer or a plurality of layers of 2 layers or more.

The resin which constitutes the foamed insulating layer is preferably a resin which allows a varnish formation so that an insulating film (i.e. insulating covering) can be formed by coating and baking it on the conductor. In the present invention, as the resin which constitutes the foamed insulating layer, the thermosetting resin is used.

As the thermosetting resin, use may be made of any of conventionally used ones. In the present invention, a resin is preferred, which is selected from polyamideimide (PAI), polyimide (PI), and polyesterimide (PEsI). In particular, polyamideimide (PAI) and polyimide (PI), each of which is excellent in solvent resistance, are more preferred, and polyamideimide (PAI) is particularly preferred.

As the thermosetting resin to be used, 1 kind of the resin may be used alone or 2 kinds or more of the resins may be used by mixing.

As the polyamideimide resin, use may be made of a commercially available product (for example, HI406 (trade name, manufactured by Hitachi Chemical Co., Ltd.)) and the like, or use may be made of a product obtained by an ordinary method, for example, by directly allowing to react a tricarboxylic acid anhydride and a diisocyanate in a polar solvent.

As the polyimide, use may be made, for example, of: U imide (trade name, manufactured by Unitika Ltd.), U-varnish (trade name, manufactured by Ube Industries, Ltd.), HCI series (trade names, manufactured by Hitachi Chemical Co., Ltd.), AURUM (trade name, manufactured by Mitsui Chemicals, Inc.) and the like.

To the thermosetting resin which forms the foamed insulating layer, a thermoplastic resin having a melting point of 240° C. or more in the case of a crystalline resin may be added, or a thermoplastic resin having a glass transition temperature of 240° C. or more in the case of a non-crystalline resin may be added. As the thermoplastic resin for any of those occasions, it is desirable that a storage elastic modulus at 25° C. is 1 GPa or more. By incorporation of the thermoplastic resin, flexibility and elongation characteristics are improved. The glass transition temperature of the thermoplastic resin is preferably 180° C. or more and more preferably from 210° C. to 350° C. An addition amount of such a thermoplastic resin is preferably from 5 mass % to 50 mass % of the resin solid content.

As the thermoplastic resin which can be used for this purpose, a non-crystalline resin is preferred. For example, at least one of the resins selected from polyether imide, polyether sulfone, polyphenylene ether, polyphenyl sulfone (PPSU), and polyimide is preferred. As the polyether imide, for example, ULTEM (trade name, manufactured by GE Plastics) and the like may be used. As the polyether sulfone, for example, SUMIKA EXCEL PES (trade name, manufactured by Sumitomo Chemical Co., Ltd.), PES (trade name, manufactured by Mitsui Chemicals, Inc.), ULTRAZON E (trade name, manufactured by BASF Japan Ltd.), RADEL A (trade name, manufactured by Solvay Advanced Polymers) and the like may be used. As the polyphenyl ether, for example, ZYLON (trade name, manufactured by Asahi Kasei Chemicals), IUPIACE (trade name, manufactured by Mitsubishi Engineering-Plastics Corporation) and the like may be used. As the polyphenyl sulfone, for example, RADEL R (trade name, manufactured by Solvay Advanced Polymers) and the like may be used. As the polyimide, for example, U-VARNISH (trade name, manufactured by Ube Industries, Ltd.), HCl series (trade names, manufactured by Hitachi Chemical Co., Ltd.), U-IMIDE (trade name, manufactured by Unitika Ltd.), AURUM (trade name, manufactured by Mitsui Chemicals, Inc.) and the like may be used. In the point of being soluble in a solvent, polyphenyl sulfone and polyether imide are more preferred.

In the present invention, the thermosetting resin for forming the foamed insulated layer may contain any of various additives, within the range in which the characteristics are not affected, such as a cell nucleating agent, an antioxidant, an antistatic agent, an ultraviolet radiation inhibitor, a light stabilizer, a fluorescent whitening agent, a pigment, a dye, a compatibilizer, a lubricant, a reinforcing agent, a flame retardant, a crosslinking agent, a crosslinking coagent, a plasticizer, a thickening agent, a viscosity reducer, and an elastomer. Moreover, a layer formed of the resin containing any of these additives may be laminated on the resultant insulated wire, separated from the foamed insulated layer, or the insulated wire may be coated with a coating material containing any of these additives.

In order to lower a relative dielectric constant of the foamed insulating layer composed of the thermosetting resin having bubbles, the foam magnification of the foamed insulating layer is preferably 1.2-fold or more, and more preferably 1.4-fold or more. The upper limit of the foam magnification is not particularly restricted, but it is usually preferable to set the foam magnification to 5.0-fold or less. The foam magnification is obtained by measuring the density of a resin coated for foam ($\rho f$) and the density of the resin before foam ($\rho s$) in accordance with an underwater substitution method, and by calculating the foam magnification from ($\rho s/\rho f$).

In the present invention, in order to improve flexibility of the foamed insulating layer, bubble densities are different in the thickness direction.

Herein, a difference in the bubble densities means a density difference in the same foamed resin layer, and a bubble density can be obtained by observing an insulating film of the insulated wire in accordance with the following method.

Figure 4:
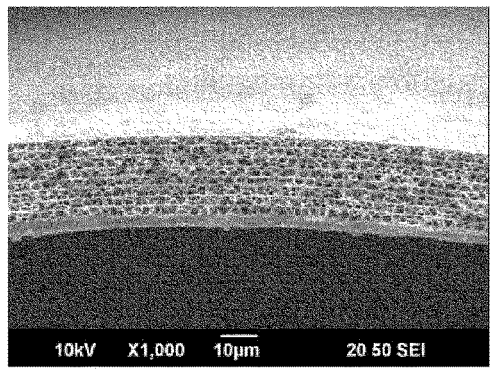
FIG. 4 is a scanning electron micrograph of the cross-section of the insulated wire for explaining a method of calculating a bubble density.

The insulating film of the insulated wire is cleaved in the thickness direction while cooling in liquid nitrogen, and the cross section in the thickness direction is photographed at 300- to 3,000-fold magnification by a scanning electron microscope (SEM). The magnification is adjusted so that the thickness of the whole film can be fitted inside the entire observing screen. For example, when the thickness of the whole film is 200 μm, adjustment to the 300-fold magnification is good. When the thickness of the whole film is 10 μm, adjustment to the 3,000-fold magnification is good. The taken SEM photograph of the cross section is retrieved into image analysis software, for example, "WinROOF ver.7.1" (a product of Mitani Corporation). An area ratio can be calculated by this image analysis software. Like the photograph shown in FIG. 4, the longitudinal direction on the screen is adjusted so that the thickness of the whole film can be seen.

Figure 5:
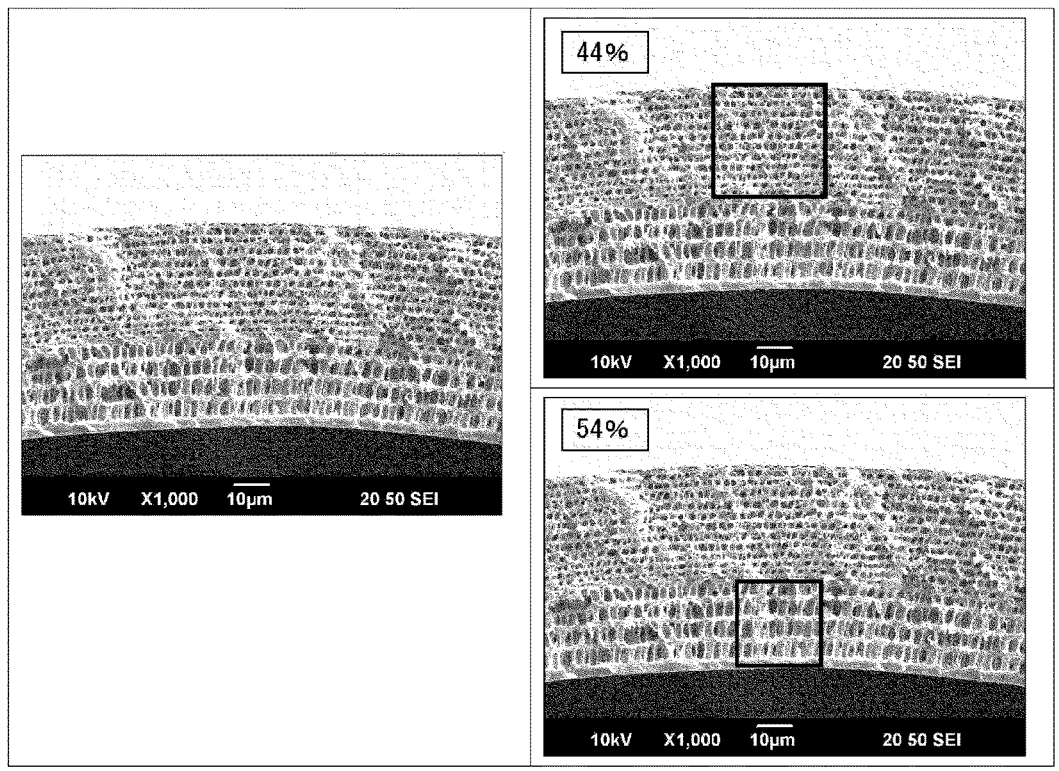
FIG. 5 is a scanning electron micrograph of the cross-section of the insulated wire for explaining a method of calculating a bubble density, and shows bubble densities measured at the upper side and the lower side of the foamed insulating layer.

From the SEM photograph of the whole thickness, in the case where there is obviously a bias in the distribution of the voids in the foamed insulating layer, an area of 1×1 square, provided that the thickness in each of the distributions is 1, is set as a measurement range. For example, in the case where there is a difference of 10% or more in the bubble density, it is often the case that existence of the distribution can be discriminated even with the naked eye as shown in FIG. 5.

From the SEM photograph in the thickness direction, in the case where the distribution of holes is unclear, a measurement range is set with respect to each 5 μm×5 μm from the conductor side. Note that, the SEM photograph shown in FIG. 4 corresponds to this case. For example, in the case where the thickness of the foamed insulating layer is 30 μm, the measurement range results in a total of 6 places in a longitudinal direction.

The measurement range is subject to image analysis, thereby to calculate an area ratio.

Herein, the area ratio means a ratio of holes in the area of the measurement range. The calculated area ratio (%) is defined as a bubble density (%).

The bubble density difference (%) in the present invention means a difference between a maximum bubble density (%) and a minimum bubble density (%) in the same layer.

In the present invention, the bubble density difference in the thickness direction of the foamed insulating layer is preferably 3% or more and particularly preferably 5% or more.

Note that, if there is a bubble density difference of 3% or more in the thickness direction, the bubble density is judged to have a gradient.

In the present invention, it has been found that if the bubble density has a gradient of 3% or more, flexibility is predominantly improved, when compared to the case where the bubble density has no gradient.

The bubble density difference is desirably a difference of 90% at a maximum and 3% at a minimum, and particularly desirably a difference of 90% at a maximum and 5% at a minimum.

In the present invention, when a bubble density is discussed, sometimes the bubble density is classified into "middle" which is a range of square pixel numbers arbitrarily set from the above described viewpoint, "bottom" which is a range of arbitrary square pixel numbers set at the conductor side without including the "middle" range, and "top" which is a range of arbitrary square pixel numbers set at the film surface side without including the "middle" range Formation of the foamed insulating layer whose bubble density as described above is different in the same foamed insulating layer in the present invention, can be achieved by adjustment of a furnace temperature and multiple repetitions of both varnish-coating and baking, as shown in the following Example section.

An average bubble diameter of the foamed insulating layer is preferably 10 µm or less, more preferably 5 µm or less, still preferably 3 µm or less, and particularly preferably 1 µm or less. If the average bubble diameter is more than 10 µm, a dielectric breakdown voltage is sometimes lowered. In contrast, the dielectric breakdown voltage can be maintained successfully by setting the average bubble diameter to 10 µm or less. Moreover, by setting the average bubble diameter to 5 µm or less, or 3 µm or less, the dielectric breakdown voltage can be kept more certainly in this sequential order. There is no particular restriction to the lower limit of the average bubble diameter, but it is practical and preferable to be 1 nm or more.

The average bubble diameter is a value obtained by observing the cross section of the foamed insulating layer using a scanning electron microscope (SEM), selecting randomly a total of 50 bubbles equally from the region in which the bubble density has been observed, and by measuring them in a diameter measurement mode using an image size measurement software (WinROOF, manufactured by Mitani Corporation), and then by calculating an average of the measured diameters. This bubble diameter can be adjusted by a production process, such as a foam magnification, a concentration, viscosity or temperature of the resin, an addition amount of the foaming agent, and a temperature of the baking furnace.

The foamed insulating layer contains the air, which allows: lowering of relative dielectric constant; and suppression of a partial discharge and a corona discharge, generated at an air gap between wires to which a voltage was applied.

The foamed insulating layer can be obtained by coating and baking an insulating varnish which is a mixture of the thermosetting resin and 2 kinds or more, preferably 3 kinds or more of solvents containing a specific organic solvent and at least one high-boiling solvent, on the periphery of the conductor. The coating of the varnish may be carried out on the conductor, directly or by intervention of another insulating layer (resin layer).

The organic solvent for the varnish that can be used in the foamed insulating layer, acts as a solvent which dissolves the thermosetting resin This organic solvent is not particularly limited as long as the organic solvent does not inhibit the reaction of the thermosetting resin, and examples thereof include: amide-based solvents, such as N-methyl-2-pyrrolidone (NMP), N,N-dimethylacetamide (DMAC), dimethylsulfoxide, and N,N-dimethylformamide; urea-based solvents, such as N,N-dimethylethyleneurea, N,N-dimethylpropyleneurea, and tetramethylurea; lactone-based solvents, such as γ-butyrolactone and γ-caprolactone; carbonate-based solvents, such as propylene carbonate; ketone-based solvents, such as methyl ethyl ketone, methyl isobutyl ketone, and cyclohexanone; ester-based solvents, such as ethyl acetate, n-butyl acetate, butyl cellosolve acetate, butyl carbitol acetate, ethyl cellosolve acetate, and ethyl carbitol acetate; glyme-based solvents, such as diglyme, triglyme, and tetraglyme; hydrocarbon-based solvents, such as toluene, xylene, and cyclohexane; and sulfone-based solvents, such as sulfolane. Among these, in view of high solubility, high reaction acceleration property or the like, an amide-based solvent or a urea-based solvent is preferred; and in view of having no hydrogen atom that apts to inhibit a crosslinking reaction due to heating or the like, N-methyl-2-pyrrolidone, N,N-dimethylacetamide, N,N-dimethylethyleneurea, N,N-dimethylpropyleneurea or tetramethylurea is further preferred, and N-methyl-2-pyrrolidone is particularly preferred. The boiling point of this organic solvent is preferably 160° C. to 250° C., and more preferably 165° C. to 210° C.

The high-boiling-solvent that can be used for bubble formation is a solvent having a boiling point of preferably 180° C. to 300° C., and more preferably 210° C. to 260° C. Specific examples thereof that can be used include: diethylene glycol dimethyl ether, triethylene glycol dimethyl ether, diethylene glycol dibutyl ether, tetraethylene glycol dimethyl ether, and tetraethylene glycol monomethyl ether. From the viewpoint of having a smaller fluctuation in the bubble size, triethylene glycol dimethyl ether is more preferred. In addition to those, the examples that can be used for bubble formation include: dipropylene glycol dimethyl ether, diethylene glycol ethyl methyl ether, dipropylene glycol monomethyl ether, diethylene glycol diethyl ether, diethylene glycol monomethyl ether, diethylene glycol butyl methyl ether, tripropylene glycol dimethyl ether, diethylene glycol monobutyl ether, ethylene glycol monophenyl ether, triethylene glycol monomethyl ether, triethylene glycol butyl methyl ether, polyethylene glycol dimethyl ether, polyethylene glycol monomethyl ether, and propylene glycol monomethyl ether.

The high-boiling solvent may be one kind thereof, but at least 2 kinds thereof are preferably used in combination, from the viewpoint of achievement of the effect that bubbles are generated in a broad temperature range. Preferred combinations of at least two kinds of the high-boiling-solvents include: tetraethylene glycol dimethyl ether with diethylene glycol dibutyl ether, diethylene glycol dibutyl ether with triethylene glycol dimethyl ether, triethylene glycol monomethyl ether with tetraethylene glycol dimethyl ether, and triethylene glycol butyl methyl ether with tetraethylene glycol dimethyl ether. More preferred combinations include: diethylene glycol dibutyl ether with triethylene glycol dimethyl ether, and triethylene glycol monomethyl ether with tetraethylene glycol dimethyl ether.

The high-boiling-solvent for bubble formation is preferably having a boiling point higher than that of the solvent in which the thermosetting resin is dissolved, and when one kind of the high-boiling-solvent is added to the varnish, it is preferable that the boiling point of the high-boiling-solvent be higher by 10° C. or more than that of the solvent in which the thermosetting resin is dissolved. Furthermore, it is understood that when one kind of the high-boiling-solvent is used, the high-boiling-solvent takes the role of both a bubble nucleating agent and a foaming agent. On the other hand, when two or more kinds of the high-boiling-solvents are used, the solvent having the highest boiling point acts as a foaming agent, and a high-boiling-solvent for bubble formation having a boiling point that is intermediate acts as a bubble nucleating agent. The solvent having the highest boiling point preferably has a boiling point that is higher by 20° C. or more, and more preferably by 30° C. to 60° C., than the specific organic solvent. The high-boiling-solvent for bubble formation having the intermediate boiling point may have a boiling point that is intermediate between the boiling point of the solvent that acts as a foaming agent and the boiling point of the specific organic solvent, and preferably has a difference in boiling point of 10° C. or more from the boiling point of the foaming agent. In a case where the high-boiling-solvent for bubble formation having the intermediate boiling point has a solubility for the thermosetting resin higher than that of the solvent that acts as a foaming agent, uniform bubbles can be formed after varnish-baking. In the case where 2 or more kinds of the high-boiling-solvents are used, as a use rate thereof, the use rate of a high-boiling solvent having the highest boiling point to a high-boiling-solvent having an intermediate-boiling point is, for example, in terms of mass ratio, preferably from 99/1 to 1/99 and more preferably from 10/1 to 1/10 in the point of easiness in the bubble formation.

<Inner Insulating Layer>

The insulated wire of the present invention may have the inner insulating layer composed of the thermosetting resin between the conductor and the foamed insulating layer composed of the thermosetting resin. Note that, it is preferred that this inner insulating layer is not any foamed insulating layer.

A thickness of the inner insulating layer is preferably from 1 to 40 μm and more preferably from 1 to 25 μm.

<Outer Insulating Layer>

In the insulated wire of the present invention, the outer insulating layer may be formed, directly or through the interior insulating layer, on the outer periphery of the foamed insulating layer.

The inventors of the present invention have found that, using a fact that a shape of the foamed insulating layer can be deformed by incorporating the air therein, air gaps can be filled by providing a thermoplastic resin layer as an outer insulating layer for the top layer above this foamed insulating layer, and therefore the insulated wire of the present invention is excellent in a performance of suppressing generation of a partial discharge. In order to further enhance this effect, it is preferred to use, as a thermoplastic resin that can be used in the outer insulating layer, a thermoplastic resin having a glass transition temperature of 240° C. or more in the case of a non-crystalline resin, or a thermoplastic resin having a melting point of 240° C. or more in the case of a crystalline resin.

As the insulated wire of the present invention is used as a member of the electric component, it is preferred to use a thermoplastic resin which is excellent in heat resistance and chemical resistance as a material of the outer insulating layer. As the forgoing thermoplastic resin, in the present invention, for example, any of engineering plastics and super engineering plastics are preferred.

Examples of the engineering plastics and the super engineering plastics include: general-purpose engineering plastics, such as polyimide (PA) (nylon), polyacetal (POM), polycarbonate (PC), polyphenylene ether (including a modified polyphenylene ether), polybutylene terephthalate (PBT), polyethylene terephthalate (PET), a syndiotactic polystyrene resin (SPS), polyethylene naphthalate (PEN), and super-high-molecular polyethylene; in addition, super engineering plastics, such as polysulfone (PSF), polyether sulfone (PES), polyphenylene sulfide (PPS), polyarylate (U polymer), polyether ketone (PEK), polyaryl ether ketone (PAEK), polyether ether ketone (PEEK), polyimide (PI), a thermoplastic polyimide resin (TPI), polyamideimide (PAI), and a liquid-crystal polyester; further a polymer alloy containing polyethylene terephthalate (PET) or polyethylene naphthalate (PEN) as a base resin; and a polymer alloy containing any of the forgoing engineering plastics, such as ABS/polycarbonate, polyphenylene ether/nylon 6,6, polyphenylene ether/polystyrene, and polybutylene terephthalate/polycarbonate. In the present invention, use can be particularly preferably made of: a syndiotactic polystyrene resin (SPS), polyphenylene sulfide (PPS), polyaryl ether ketone (PAEK), polyether ether ketone (PEEK), and a thermoplastic polyimide resin (TPI), from the viewpoint of heat resistance and stress cracking resistance. Further, the resin to be used is not limited by the resin names described above, but as a matter of course, resins other than the exemplified resins can be also used, as long as they are more excellent in performance than the exemplified resins.

Among these thermoplastic resins, examples of the crystalline thermoplastic resins include: general-purpose engineering plastics, such as polyamide (PA), polyacetal (POM), polybutylene terephthalate (PBT), polyethylene terephthalate (PET), polyphenylene sulfide (PPS), and super-high-molecular polyethylene; polyether ether ketone (PEEK); polyether ketone (PEK); polyaryl ether ketone (PAEK) (including a modified PEEK); and a thermoplastic polyimide resin (TPI). Further, the thermoplastic resin includes a polymer alloy using the above-described crystalline thermoplastic resin. On the other hand, examples of the non-crystalline thermoplastic resins include: polycarbonate (PC), polyphenylene ether, polyarylate, a syndiotactic polystyrene resin (SPS), polyamideimide (PAI), polybenzimidazole (PBI), polysulfone (PSF), polyether sulfone (PES), polyether imide (PEI), polyphenyl sulfone (PPSU), a non-crystalline thermoplastic polyimide resin, and the like.

In the present invention, among these thermoplastic resins, it is preferred to select a crystalline thermoplastic resin having a melting point (mp) of 240° C. or more, or a non-crystalline thermoplastic resin having a glass-transition temperature (Tg) of 240° C. or more. Examples of the crystalline thermoplastic resin having a melting point of 240° C. or more include: a thermoplastic polyimide resin (TPI) (mp 388° C.), PPS (mp 275° C.), PEEK (mp 340° C.), polyaryl ether ketone (PAEK) (mp 340° C.), and the like. Examples of the non-crystalline thermoplastic resin having a glass-transition temperature of 240° C. or more include: a non-crystalline thermoplastic polyimide resin (Tg 250° C.), polyamideimide (PAI) (Tg 280° C. to 290° C.), polyamideimide (PAI) (Tg 435° C.), a syndiotactic polystyrene resin (SPS) (Tg 280° C.), and the like. The melting point can be measured by observing a melting temperature for 10 mg of the sample at the rate of temperature raise of 10° C./min, using DSC (differential scanning calorimetric analysis), for example, DSC-60 (trade name) manufactured by Shimadzu Corporation. The glass-transition temperature can be measured by observing a glass-transition temperature for 10 mg of the sample at the rate of temperature raise of 10° C./min, using DSC as is the case with the melting point.

It is preferred that the outer insulating layer contains a crystalline thermoplastic resin having a melting point of 240° C. or more, or a non-crystalline thermoplastic resin having a glass-transition temperature of 240° C. or more. In place of or in addition to these resins, incorporation of a crystalline thermoplastic resin having a melting point of 270° C. or more is preferred, from the viewpoint that an effect of improving a winding performance is obtained due to improvement of heat resistance and also, in addition to this, inclination of enhancing mechanical strength. The content of the crystalline thermoplastic resin having a melting point of 270° C. or more in the outer insulating layer is preferably 10 mass % or more and particularly preferably 60 mass % or more, of the resin components which form the outer insulating layer. Note that, the crystalline thermoplastic resins having a melting point of 270° C. or more are those described above.

In the present invention, for the outer insulating layer, use may be made of: not only any of the above-described thermoplastic resins, but also any of thermosetting resins.

It is preferred that the storage elastic modulus at 25° C. of the thermoplastic resin contained in the outer insulating layer is 1 GPa or more. In the case where the storage elastic modulus at 25° C. is less than 1 GPa, an effect of deformation of the thermoplastic resin is high. However, this causes such a problem that when a coil is formed, a low load condition is required due to lowering in abrasion characteristics. In the case where the storage elastic modulus at 25° C. is 1 GPa or more, resistance to abrasion characteristics can be kept further to a good level, without damaging a shape-changeable ability of the thermoplastic resin. The storage elastic modulus of the thermoplastic resin at 25° C. is more preferably 2 GPa or more. The upper limit of the storage elastic modulus is not particularly restricted. However, in the case of too high storage elastic modulus, there arises a problem that flexibility required for the winding wire lowers and therefore it is favorable that the upper limit is, for example, 6 GPa.

In the present invention, the storage elastic modulus of the thermoplastic resin which forms each insulating layer of the insulated wire is a value that is measured by using a viscoelasticity analyzer [DMS200 (trade name) manufactured by Seiko Instruments Inc.]. Specifically, by using a 0.2 mm thick test specimen which has been prepared with a thermoplastic resin which forms each insulating layer of the insulated wire, and by recording a measured value of the storage elastic modulus at the state when the temperature has been stabilized at 25° C. under the conditions that a rate of temperature raise is 2° C./min and a frequency is 10 Hz, the recorded value is defined as a storage elastic modulus at 25° C. of the thermoplastic resin.

Examples of the thermoplastic resin contained in the outer insulating layer, whose storage elastic modulus at 25° C. is 1 GPa or more include: commercially available products, such as, as regards PEEK, PEEK 450G (trade name, storage elastic modulus at 25° C.: 3,840 MPa, storage elastic modulus at 300° C.: 187 MPa, melting point: 340° C.) manufactured by Victrex Japan Inc.; as regards a modified PEEK, AVASPIRE AV-650 (trade name, storage elastic modulus at 25° C.: 3,700 MPa, storage elastic modulus at 300° C.: 144 MPa, melting point: 345° C.) or AV-651 (trade name, storage elastic modulus at 25° C.: 3,500 MPa, storage elastic modulus at 300° C.: 130 MPa, melting point: 345° C.) manufactured by Solvay K.K.; as regards TPI, AURUM PL 450C (trade name, storage elastic modulus at 25° C.: 1,880 MPa, storage elastic modulus at 300° C.: 18.9 MPa, melting point: 388° C.) manufactured by Mitsui Chemicals, Inc.; as regards PPS, FORTRON 0220A9 (trade name, storage elastic modulus at 25° C.: 2,800 MPa, storage elastic modulus at 300° C.: <10 MPa, melting point: 278° C.) manufactured by Polyplastics Co., Ltd., or PPS FZ-2100 (trade name, storage elastic modulus at 25° C.: 1,600 MPa, storage elastic modulus at 300° C.: <10 MPa, melting point: 275° C.) manufactured by DIC Corporation; as regards SPS, XAREC S105 (trade name, storage elastic modulus at 25° C.: 2,200 MPa, glass transition temperature: 280° C.) manufactured by Idemitsu Kosan Co., Ltd.; as regards PA, NYLON 6,6 (FDK-1 (trade name), manufactured by UNITIKA LTD., storage elastic modulus at 25° C.: 1,200 MPa, storage elastic modulus at 300° C.: <10 MPa, melting point: 265° C.), NYLON 4,6 (F-5000 (trade name), manufactured by UNITIKA LTD., storage elastic modulus at 25° C.: 1,100 MPa, melting point: 292° C.), NYLON 6,T (ARLENE AE-420 (trade name) manufactured by Mitsui Chemicals, Inc., storage elastic modulus at 25° C.: 2,400 MPa, melting point: 320° C.), NYLON 9,T (GENESTOR N1006D (trade name) manufactured by KURARAY CO., LTD., storage elastic modulus at 25° C.: 1,400 MPa, melting point: 262° C.), and the like.

In the present invention, as the thermoplastic resin contained in the outer insulating layer, PEEK or a modified PEEK is particularly preferred.

The outer insulating layer does not substantially contain any partial discharge resistant substance. Herein, the partial discharge resistant substance refers to an insulating material which is insusceptible to partial discharge deterioration, and a material which has a function to improve a charge life by dispersing it in an insulating film of the wire. As the partial discharge resistant substance, there are, for example, oxides (oxides of metals or non-metal elements), nitrides, glass, mica, and the like. As specific examples thereof, the partial discharge resistant substance 3 includes: fine particles of silica, titanium dioxide, alumina, barium titanate, zinc oxide, gallium nitride, or the like. Further, the expression of "does not substantially contain" any partial discharge resistant substance means not to positively incorporate the partial discharge resistant substance in the outer insulating layer, and therefore this expression includes not only the case where any partial discharge resistant substance is not contained at all, but also the case where the partial discharge resistant substance is contained in a content of such a degree that the purpose of the present invention is not impaired. Examples of the content of such a degree that the purpose of the present invention is not impaired include a content of 30 parts by mass or less with respect to 100 parts by mass of the resin components which form an outer insulating layer.

The thermoplastic resin for forming the outer insulated layer may contain any of various additives, within the range in which the characteristics are not affected, such as an antioxidant, an antistatic agent, an ultraviolet radiation inhibitor, a light stabilizer, a fluorescent whitening agent, a pigment, a dye, a compatibilizer, a lubricant, a reinforcing agent, a flame retardant, a crosslinking agent, a crosslinking coagent, a plasticizer, a thickening agent, a viscosity reducer, and an elastomer.

The thickness of the outer insulating layer is not particularly restricted, but the thickness of 20 to 150 μm is practical and preferred. A thickness ratio of the foamed insulating layer and the outer insulating layer is only required to be appropriate. Specifically, as the thickness of the foamed insulating layer is made higher, the relative dielectric constant lowers, so that the partial discharge inception voltage can be made higher. In the case where making mechanical characteristics, such as mechanical strength and flexibility, higher or enhanced is desired, the outer insulating layer is only designed so as to make it thick. The inventors of the present invention have discovered that if the thickness ratio of the foamed insulating layer and the outer insulating layer is from 5/95 to 95/5, features of the mechanical strength and the partial discharge inception voltage are developed. In the case where the mechanical characteristics are expected. In particular, the thickness ratio of from 5/95 to 60/40 is preferred, for the enhanced mechanical strength.

Further, like the present invention, in the case where bubbles are formed in the foamed insulating layer, and where the outer insulating layer having no bubbles is formed as an outer layer of this foamed insulating layer, a gap which is formed between wires at the time of coil formation, can be buried by an effect that the foamed insulating layer is slightly crashed and deformed. If there is no gap, a partial discharge and a corona discharge which are generated between wires can be effectively suppressed.

In the present invention, the expression "having no bubbles" does not restricted only to the state that absolutely no bubbles exists, but also the case of a void of such a degree that the purpose of the present invention is not impaired, specifically a void having a diameter of less than 0.1 µm, is included in the state of having no bubbles. Existence of and absent from the bubble size which is a diameter of less than 0.1 µm can be confirmed by observing the cross section of the outer insulating layer using a scanning electron micrometer (SEM).

The outer insulating layer can be formed by a shaping method, such as extrusion-molding, with a thermoplastic resin composition containing the thermoplastic resin on the periphery of the foamed insulating layer.

<Interior Insulating Layer>

The shaping of the thermoplastic resin composition may be performed directly on the periphery of the foamed insulating layer, or by interposing another resin layer, namely an interior insulating layer between the conductor and the thermoplastic resin layer.

As a resin which forms the interior insulating layer, the thermoplastic resin is preferred, and examples thereof include the same thermoplastic resins as those exemplified for the outer insulating layer. In the thermoplastic resin composition for forming the interior insulating layer, in addition to the thermoplastic resin, for example, any of various additives and the above-described organic solvents which are added to the varnish which forms the foamed insulating layer may be contained, to the extent that the characteristics are not affected.

It is preferred that the interior insulating layer is, for example, an adhesion layer for improving interfacial adhesion property between the foamed insulating layer and the outer insulating layer. The adhesion layer is preferably formed of the same non-crystalline thermoplastic resin as the non-crystalline thermoplastic resin which forms the outer insulating layer, as described above, between the foamed insulating layer and the outer insulating layer. In this case, the adhesion layer and the outer insulating layer may be formed of the same non-crystalline thermoplastic resin or a different non-crystalline thermoplastic resin from each other. The interior insulating layer, preferably an adhesion layer, is formed as a thin film of, for example, less than 40 µm (preferably 1 µm or more and less than 25 µm). Note that, depending on a shaping condition of the outer insulating layer, when the interior insulating layer, preferably the adhesion layer, and the outer insulating layer have intermingled with each other, thereby to form an insulated wire, an accurate film thickness sometimes may not be measured.

The insulated wire of the present invention can be produced, by forming a foamed insulating layer on the outer periphery of a conductor, and then forming an outer insulating layer. Specifically, the insulated wire can be produced, by conducting a process of coating a varnish which forms a foamed insulating layer directly or indirectly on the outer periphery of a conductor, that is, if desired, through an inner insulating layer or the like, and then foaming in a step of baking thereby to form the foamed insulating layer; and a process of extruding a thermoplastic resin composition which forms an outer insulating layer on the outer periphery of the foamed insulating layer thereby to form the outer insulating layer.

In regard to an inner insulating layer and an interior insulating layer, after coating a varnish which forms the inner insulating layer or the interior insulating layer, the inner insulating layer can be formed by baking the varnish, while the interior insulating layer can be formed by a shaping method including extrusion of a resin composition, evaporation of a solvent, and so on.

Note that, an adhesion layer, whose thickness is thin, can be formed, by coating, on the foamed insulating layer, a coating material in which the same non-crystalline thermoplastic resin as the non-crystalline thermoplastic resin that forms an outer insulating layer has been dissolved in a solvent, and then evaporating the solvent.

The insulated wire of the present invention, as has the above-mentioned excellent characteristics, is applicable to a field which requires resistance to voltage and heat resistance, such as various kinds of electric equipment (which may also be called as electronic equipment). For example, the insulated wire of the present invention is used for a motor, a transformer, and the like, which can compose high-performance electric equipment. In particular, the insulated wire is preferably used as a winding wire for a driving motor of HV (hybrid vehicles) and EV (electrical vehicles). As just described, the present invention can provide electronic or electric equipment, particularly a rotating electric machine, in particular a driving motor of HV and EV, which is equipped with the insulated wire. Meanwhile, in the case where the insulated wire of the present invention is used for a motor coil, it is also called an insulated wire for the motor coil.

EXAMPLES

The present invention will be described in more detail based on examples given below, but the invention is not meant to be limited by these. Note that, in the following Examples, the term % which indicates a composition means mass %.

The insulated wires of Examples and Comparative Examples were prepared as described below, on the basis of the insulated wire shown in FIG. 2(a).

Example 1

The insulated wire shown in FIG. 2(a), except for not having any outer insulating layer 3, was prepared as described below.

First, a foamable polyamideimide varnish that can be used for forming a foamed insulating layer 2, was prepared as described below. To a 2 L-volumetric separable flask, 1,000 g of HI-406 series [N-methyl pyrolidone (NMP) solution containing a resin component of 32 mass %, boiling point of NMP 202° C.] (trade name, manufactured by Hitachi Chemical Co., Ltd.) was placed. Then, to this solution, 100 g of triethylene glycol dimethyl ether (boiling point 216° C.) and 150 g of diethylene glycol dibutyl ether (boiling point 256° C.), as foam-forming agents, were added, thereby to obtain the foamable polyamideimide varnish.

Further, as an inner insulating layer-forming polyamideimide varnish that can be used for forming a conductor-side insulating layer of an inner insulating layer 25, HI-406 series (an NMP solution containing a resin component of 32 mass %) (trade name, manufactured by Hitachi Chemical Co., Ltd.) was used. To 1,000 g of this resin, NMP as a solvent was added to make a 30 mass % resin solution for use.

Each varnish was coated by dip coating, and a coating amount was adjusted by a die. Specifically, the prepared polyamideimide varnish for forming an inner insulating layer was coated on 1.0 mmφ of a copper conductor 1, and this was baked at the furnace temperature of 500° C., to form an inner insulating layer 25 having a thickness of 5 μm. Next, the foamable polyamideimide varnish prepared above was coated on the inner insulating layer 25, and this was baked at the furnace temperature of 580° C. in the first half and at the furnace temperature of 420° C. in the last half, to form a foamed insulating layer 2 having a thickness of 80 μm. The portion which was baked at the furnace temperature of 580° C. in the "first half" corresponds to a portion whose bubble density is 65%, while the portion which was baked at the furnace temperature of 420° C. in the "last half" corresponds to a portion whose bubble density is 15%.

An insulated wire having the inner insulating layer 25 and the foamed insulating layer 2, which were formed as mentioned above, was prepared.

Example 2

Only a formed insulating layer 2 having a thickness of 80 μm was provided on 1.0 mmφ of a copper conductor 1, without providing the inner insulating layer 25 in Example 1.

First, a foamable polyimide varnish that can be used for forming a foamed insulating layer 2, was prepared as described below. To a 2 L-volumetric separable flask, 1,000 g of U-IMIDE (an NMP solution containing a resin component of 25 mass %) (trade name, manufactured by Unitika Ltd.) was placed. To this, 75 g of NMP (boiling point 202° C.), 150 g of DMAC (boiling point 165° C.), and 200 g of tetraethylene glycol dimethyl ether (boiling point 275° C.), as foam-forming agents, were added, thereby to obtain the foamable polyimide varnish. The foamable polyimide varnish prepared above was coated on the same conductor 1 as in Example 1, and this was baked at the furnace temperature of 540° C. in the first half and at the furnace temperature of 520° C. in the last half, thereby to prepare an insulated wire in which a foamed insulating layer 2 having a thickness of 80 μm has been formed. The portion which was baked at the furnace temperature of 540° C. in the "first half" corresponds to a portion whose bubble density is 50%, while the portion which was baked at the furnace temperature of 520° C. in the "last half" corresponds to a portion whose bubble density is 45%.

An insulated wire in which the foamed insulating layer 2 was formed as mentioned above, was prepared.

Example 3

An inner insulating layer 25 and a foamed insulating layer 2 were provided on a conductor 1 in the same manner as in Example 1.

First, a foamable polyimide varnish that can be used for forming the foamed insulating layer 2, was prepared as described below. To a 2 L-volumetric separable flask, 1,000 g of U-IMIDE (an NMP solution containing a resin component of 25 mass %) (trade name, manufactured by Unitika Ltd.) was placed. To this, 75 g of NMP (boiling point 202° C.), 150 g of DMAC (boiling point 165° C.), and 200 g of tetraethylene glycol dimethyl ether (boiling point 275° C.) were added, thereby to obtain the foamable polyimide varnish.

Further, as an inner insulating layer-forming polyimide varnish that can be used for forming a conductor-side insulating layer of an inner insulating layer 25, U-IMIDE (an NMP solution containing a resin component of 25 mass %) (trade name, manufactured by Unitika Ltd.) was used. To 1,000 g of this resin, NMP as a solvent was added to make a 30 mass % resin solution for use.

Each varnish was coated by dip coating, and a coating amount was adjusted by a die. Specifically, the prepared polyimide varnish for forming an inner insulating layer was coated on the copper conductor 1 as in Example 1, and this was baked at the furnace temperature of 500° C., to form an inner insulating layer 25 having a thickness of 5 μm. Next, the foamable polyimide varnish prepared above was coated on the inner insulating layer 25, and this was baked at the furnace temperature of 440° C. in the first half and at the furnace temperature of 460° C. in the last half, to form a foamed insulating layer 2 having a thickness of 50 μm. The portion which was baked at the furnace temperature of 440° C. in the "first half" corresponds to a portion whose bubble density is 20%, while the portion which was baked at the furnace temperature of 460° C. in the "last half" corresponds to a portion whose bubble density is 23%.

An insulated wire having the inner insulating layer 25 and the foamed insulating layer 2, which were formed as mentioned above, was prepared.

Example 4

An inner insulating layer 25 and a foamed insulating layer a were provided on a conductor 1 in the same manner as in Example 1, and further a foamed insulating layer b which is different from the foamed insulating layer a was provided on the foamed insulating layer a.

First, a foamable polyamideimide varnish that can be used for forming the foamed insulating layer a, was prepared as described below. To a 2 L-volumetric separable flask, 1,000 g of HI-406 series [N-methyl pyrolidone (NMP) solution containing a resin component of 32 mass %, boiling point of NMP 202° C.] (trade name, manufactured by Hitachi Chemical Co., Ltd.) was placed. Then, to this solution, 100 g of triethylene glycol dimethyl ether (boiling point 216° C.) and 150 g of diethylene glycol dibutyl ether (boiling point 256° C.), as foam-forming agents, were added, thereby to obtain the foamable polyamideimide varnish.

Further, a foamable polyimide varnish that can be used for forming the foamed insulating layer b, was prepared as described below. To a 2 L-volumetric separable flask, 1,000 g of U-IMIDE (an NMP solution containing a resin component of 25 mass %) (trade name, manufactured by Unitika Ltd.) was placed. Then, to this solution, 75 g of NMP (boiling point 202° C.), 150 g of DMAC (boiling point 165° C.), and 200 g of tetraethylene glycol dimethyl ether (boiling point 275° C.) were added, thereby to obtain the foamable polyimide varnish.

Still further, as an inner insulating layer-forming polyamideimide varnish that can be used for forming a conductor-side insulating layer of an inner insulating layer 25, HI-406 series (an NMP solution containing a resin component of 32 mass %) (trade name, manufactured by Hitachi Chemical Co., Ltd.) was used. To 1,000 g of this resin, NMP as a solvent was added, to make a 30 mass % resin solution for use.

Each varnish was coated by dip coating, and a coating amount was adjusted by a die.

On the same copper conductor 1 as in Example 1, the prepared polyamideimide varnish for forming an inner insulating layer was coated, and this was baked at the furnace temperature of 500° C., to form an inner insulating layer 25 having a thickness of 3 µm. Next, the above-prepared foamable polyamideimide varnish for forming the foamed insulating layer a was coated on the inner insulating layer 25, and this was baked at the furnace temperature of 560° C. in the first half and at the furnace temperature of 440° C. in the last half, to form a foamed insulating layer a having a thickness of 30 µm. The portion which was baked at the furnace temperature of 560° C. in the "first half" corresponds to a portion whose bubble density is 60%, while the portion which was baked at the furnace temperature of 440° C. in the "last half" corresponds to a portion whose bubble density is 20%.

Next, the above-prepared foamable polyimide varnish for forming the foamed insulating layer b was coated on the foamed insulating layer a, and this was baked at the furnace temperature of 560° C. in the first half and at the furnace temperature of 520° C. in the last half, to form a foamed insulating layer b having a thickness of 30 µm. The portion which was baked at the furnace temperature of 560° C. in the "first half" corresponds to a portion whose bubble density is 55%, while the portion which was baked at the furnace temperature of 520° C. in the "last half" corresponds to a portion whose bubble density is 45%.

An insulated wire having the inner insulating layer 25 and 2 layers of the foamed insulating layer 2 (a and b), which were formed as mentioned above, was prepared.

Example 5

An inner insulating layer 25 and a foamed insulating layer 2 were provided on a conductor 1 in the same manner as in Example 1.

First, a foamable polyamideimide varnish that can be used for forming a foamed insulating layer 2, was prepared as described below. To a 2 L-volumetric separable flask, 1,000 g of HI-406 series [N-methyl pyrolidone (NMP) solution containing a resin component of 32 mass %, boiling point of NMP 202° C.] (trade name, manufactured by Hitachi Chemical Co., Ltd.) was placed. Then, to this solution, 100 g of triethylene glycol dimethyl ether (boiling point 216° C.) and 150 g of diethylene glycol dibutyl ether (boiling point 256° C.), as foam-forming agents, were added, thereby to obtain the foamable polyamideimide varnish.

Further, as an inner insulating layer-forming polyamideimide varnish that can be used for forming a conductor-side insulating layer of an inner insulating layer 25, HI-406 series (an NMP solution containing a resin component of 32 mass %) (trade name, manufactured by Hitachi Chemical Co., Ltd.) was used. To 1,000 g of this resin, NMP as a solvent was added to make a 30 mass % resin solution for use.

Each varnish was coated by dip coating, and a coating amount was adjusted by a die. Specifically, the prepared polyamideimide varnish for forming an inner insulating layer was coated on the same copper conductor 1 as in Example 1, and this was baked at the furnace temperature of 500° C., to form an inner insulating layer 25 having a thickness of 5 µm. Next, the foamable polyamideimide varnish prepared above was coated on the inner insulating layer 25, and this was baked at the furnace temperature of 600° C. in the first section, at the furnace temperature of 500° C. in the middle section, and at the furnace temperature of 400° C. in the last section, to form a foamed insulating layer 2 having a thickness of 150 µm. The portion which was baked at the furnace temperature of 600° C. in the "first section" corresponds to a portion whose bubble density is 70%, the portion which was baked at the furnace temperature of 500° C. in the "middle section" corresponds to a portion whose bubble density is 40%, and the portion which was baked at the furnace temperature of 400° C. in the "last section" corresponds to a portion whose bubble density is 10%.

An insulated wire having the inner insulating layer 25 and the foamed insulating layer 2, which were formed as mentioned above, was prepared.

Example 6

An inner insulating layer 25 and a foamed insulating layer 2 were provided on a conductor 1 in the same manner as in Example 1, further an outer insulating layer was provided on the foamed insulating layer 2.

First, a foamable polyamideimide varnish that can be used for forming a foamed insulating layer 2, was prepared as described below. To a 2 L-volumetric separable flask, 1,000 g of HI-406 series [N-methyl pyrolidone (NMP) solution containing a resin component of 32 mass %, boiling point of NMP 202° C.] (trade name, manufactured by Hitachi Chemical Co., Ltd.) was placed. Then, to this solution, 100 g of triethylene glycol dimethyl ether (boiling point 216° C.) and 150 g of diethylene glycol dibutyl ether (boiling point 256° C.), as foam-forming agents, were added, thereby to obtain the foamable polyamideimide varnish.

Further, as an inner insulating layer-forming polyamideimide varnish that can be used for forming a conductor-side insulating layer of an inner insulating layer 25, HI-406 series (an NMP solution containing a resin component of 32 mass %) (trade name, manufactured by Hitachi Chemical Co., Ltd.) was used. To 1,000 g of this resin, NMP as a solvent was added to make a 30 mass % resin solution for use.

Each varnish was coated by dip coating, and a coating amount was adjusted by a die. Specifically, the prepared polyamideimide varnish for forming an inner insulating layer was coated on the same copper conductor 1 as in Example 1, and this was baked at the furnace temperature of 500° C., to form an inner insulating layer 25 having a thickness of 4 µm. Next, the foamable polyamideimide varnish prepared above was coated on the inner insulating layer 25, and this was baked at the furnace temperature of 600° C. in the first section, at the furnace temperature of 440° C. in the middle section, and at the furnace temperature of 600° C. in the last section, to form a foamed insulating layer 2 having a thickness of 40 µm. The portion which was baked at the furnace temperature of 600° C. in the "first section" corresponds to a portion whose bubble density is 70%, the portion which was baked at the furnace temperature of 440° C. in the "middle section" corresponds to a portion whose bubble density is 20%, and the portion which was baked at the furnace temperature of 600° C. in the "last section" corresponds to a portion whose bubble density is 70%.

Further, on the outside of the foamed insulating layer 2, the outer insulating layer 3 of the extrusion-coating resin layer was formed, by using polyether ether ketone (PEEK) (trade name: KETASPIRE KT-880, manufactured by Solvay Specialty Polymers K.K., relative dielectric constant at 25° C.: 3.2, relative dielectric constant at 200° C.: 4.5) for an extrusion-coating resin.

As a screw of an extruder, a 30 mm full-flight screw, in which L/D=20 was used, and in which a compression ratio was set to 3. Extrusion temperature conditions were set to C1: 300° C., C2: 370° C., C3: 380° C., H: 390° C., D: 390° C., respectively. Herein, C1, C2, and C3 represent temperatures of a cylinder in the extruder to sequentially indicate temperatures of three (3) zones from a raw material-resin charging side. Moreover, H represents a temperature of a head part, and D represents a temperature of a die part.

The above resin was extrusion-coated using an extrusion die, and then after a lapse of 10 seconds, by water cooling, the outer insulating layer 3 of the extrusion-coating resin layer having a thickness of 30 μm was formed. Thus, an insulated wire having the inner insulating layer 25, the foamed insulating layer 2 and the outer insulating layer 3 was prepared.

Example 7

An inner insulating layer 25 and a foamed insulating layer 2 were provided on a conductor 1 in the same manner as in Example 1.

First, a foamable polyimide varnish that can be used for forming a foamed insulating layer 2, was prepared as described below. To a 2 L-volumetric separable flask, 1,000 g of U-IMIDE (an NMP solution containing a resin component of 25 mass %) (trade name, manufactured by Unitika Ltd.) was placed. To this, 75 g of NMP (boiling point 202° C.), 150 g of DMAC (boiling point 165° C.), and 200 g of tetraethylene glycol dimethyl ether (boiling point 275° C.), as foam-forming agents, were added, thereby to obtain the foamable polyimide varnish.

Further, as an inner insulating layer-forming polyamideimide varnish that can be used for forming a conductor-side insulating layer of an inner insulating layer 25, HI-406 series (an NMP solution containing a resin component of 32 mass %) (trade name, manufactured by Hitachi Chemical Co., Ltd.) was used. To 1,000 g of this resin, NMP as a solvent was added to make a 30 mass % resin solution for use.

Each varnish was coated by dip coating, and a coating amount was adjusted by a die.

The prepared polyamideimide varnish for forming an inner insulating layer was coated on the same copper conductor 1 as in Example 1, and this was baked at the furnace temperature of 500° C., to form an inner insulating layer 25 having a thickness of 5 μm. Next, the foamable polyimide varnish prepared above was coated on the inner insulating layer 25, and this was baked at the furnace temperature of 540° C. in the first half, and at the furnace temperature of 440° C. in the last half, to form a foamed insulating layer 2 having a thickness of 30 μm. The portion which was baked at the furnace temperature of 540° C. in the "first half" corresponds to a portion whose bubble density is 50%, and the portion which was baked at the furnace temperature of 440° C. in the "last half" corresponds to a portion whose bubble density is 35%.

An insulated wire having the inner insulating layer 25 and the foamed insulating layer 2, which were formed as mentioned above, was prepared.

Example 8

An inner insulating layer 25 and a foamed insulating layer 2 were provided on a conductor 1 in the same manner as in Example 1, further an outer insulating layer was provided on the foamed insulating layer 2.

First, a foamable polyimide varnish that can be used for forming a foamed insulating layer 2, was prepared as described below. To a 2 L-volumetric separable flask, 1,000 g of U-IMIDE (an NMP solution containing a resin component of 25 mass %) (trade name, manufactured by Unitika Ltd.) was placed. To this, 75 g of NMP (boiling point 202° C.), 150 g of DMAC (boiling point 165° C.), and 200 g of tetraethylene glycol dimethyl ether (boiling point 275° C.), as foam-forming agents, were added, thereby to obtain the foamable polyimide varnish.

Further, as an inner insulating layer-forming polyamideimide varnish that can be used for forming a conductor-side insulating layer of an inner insulating layer 25, HI-406 series (an NMP solution containing a resin component of 32 mass %) (trade name, manufactured by Hitachi Chemical Co., Ltd.) was used. To 1,000 g of this resin, NMP as a solvent was added to make a 30 mass % resin solution for use.

Each varnish was coated by dip coating, and a coating amount was adjusted by a die.

The prepared polyamideimide varnish for forming an inner insulating layer was coated on the same copper conductor 1 as in Example 1, and this was baked at the furnace temperature of 500° C., to form an inner insulating layer 25 having a thickness of 5 μm. Next, the foamable polyimide varnish prepared above was coated on the inner insulating layer 25, and this was baked at the furnace temperature of 420° C. in the first half, and at the furnace temperature of 560° C. in the last half, to form a foamed insulating layer 2 having a thickness of 8 μm. The portion which was baked at the furnace temperature of 420° C. in the "first half" corresponds to a portion whose bubble density is 15%, and the portion which was baked at the furnace temperature of 560° C. in the "last half" corresponds to a portion whose bubble density is 55%.

Further, on the outside of the foamed insulating layer 2, as an outer insulating layer-forming polyimide varnish that can be used for forming an outer insulating layer, U-IMIDE (an NMP solution containing a resin component of 25 mass %) (trade name, manufactured by Unitika Ltd.) was used. To 1,000 g of this resin, NMP as a solvent was added to make a 30 mass % resin solution for use.

This was coated by dip coating on the foamed insulating layer 2, and was baked at the furnace temperature of 500° C., thereby to form the outer insulating layer 3 having a thickness of 25 μm.

Thus, an insulated wire having the inner insulating layer 25, the foamed insulating layer 2 and the outer insulating layer 3 was prepared.

Comparative Example 1

On a conductor 1, an inner insulating layer 25 and an insulating layer composed of an ordinary thermosetting resin, which is not any foamed insulating layer, were provided.

First, a polyamideimide varnish that can be used for forming the insulating layer composed of a thermosetting resin, was prepared as described below. To a 2 L-volumetric separable flask, 1,000 g of HI-406 series (an NMP solution containing a resin component of 32 mass %, boiling point of NMP 202° C.) (trade name, manufactured by Hitachi Chemical Co., Ltd.) was placed. To this solution, NMP as a solvent was added to make a 30 mass % resin solution for use.

Further, as an inner insulating layer-forming polyimide that can be used for forming a conductor-side insulating layer of an inner insulating layer 25, U-IMIDE (an NMP solution containing a resin component of 25 mass %) (trade name, manufactured by Unitika Ltd.) was used. To 1,000 g of this resin, NMP as a solvent was added to make a 30 mass % resin solution for use.

Each varnish was coated by dip coating, and a coating amount was adjusted by a die. Specifically, the prepared inner insulating layer-forming polyamideimide varnish was coated on the same copper conductor 1 as in Example 1, and this was baked at the furnace temperature of 500° C., to form an inner insulating layer 25 having a thickness of 3 µm. Next, the above-prepared polyamideimide varnish was coated on the inner insulating layer 25, and this was baked at the furnace temperature of 500° C., to form an insulating layer composed of the thermosetting resin having a thickness of 30 µm.

Thus, an insulated wire having the inner insulating layer 25, and the ordinary insulating layer which is not any foamed insulating layer, was prepared.

Comparative Example 2

An inner insulating layer 25 and a foamed insulating layer 2 were provided on a conductor 1 in the same manner as in Example 1.

First, a foamable polyimide varnish that can be used for forming a foamed insulating layer 2, was prepared as described below. To a 2 L-volumetric separable flask, 1,000 g of U-IMIDE (an NMP solution containing a resin component of 25 mass %) (trade name, manufactured by Unitika Ltd.) was placed. To this, 75 g of NMP (boiling point 202° C.), 150 g of DMAC (boiling point 165° C.), and 200 g of tetraethylene glycol dimethyl ether (boiling point 275° C.) were added, thereby to obtain the foamable polyimide varnish.

Further, as an inner insulating layer-forming polyimide varnish that can be used for forming a conductor-side insulating layer of an inner insulating layer 25, U-IMIDE (an NMP solution containing a resin component of 25 mass %) (trade name, manufactured by Unitika Ltd.) was used. To 1,000 g of this resin, NMP as a solvent was added to make a 30 mass % resin solution for use.

Each varnish was coated by dip coating, and a coating amount was adjusted by a die. Specifically, on the same copper conductor 1 as in Example 1, the prepared polyimide varnish for forming the inner insulating layer was coated, and this was baked at the furnace temperature of 500° C., to form an inner insulating layer 25 having a thickness of 3 µm. Next, the above-prepared foamable polyimide varnish was coated on the inner insulating layer 25, and this was baked at the furnace temperature of 600° C., thereby to form a foamed insulating layer 2 having a thickness of 50 µm and a bubble density of 70%.

An insulated wire having the inner insulating layer 25 and the foamed insulating layer 2 formed as mentioned above, was prepared.

Comparative Example 3

An inner insulating layer 25 and a foamed insulating layer 2 were provided on a conductor 1 in the same manner as in Example 1.

First, a foamable polyamideimide varnish that can be used for forming a foamed insulating layer 2, was prepared as described below. To a 2 L-volumetric separable flask, 1,000 g of HI-406 series [N-methyl pyrolidone (NMP) solution containing a resin component of 32 mass %, boiling point of NMP 202° C.] (trade name, manufactured by Hitachi Chemical Co., Ltd.) was placed. To this solution, 100 g of triethylene glycol dimethyl ether (boiling point 216° C.) and 150 g of diethylene glycol dibutyl ether (boiling point 256° C.), as foam-forming agents, were added, thereby to obtain the foamable polyamideimide varnish.

Further, as an inner insulating layer-forming polyamideimide varnish that can be used for forming a conductor-side insulating layer of an inner insulating layer 25, HI-406 series (an NMP solution containing a resin component of 32 mass %) (trade name, manufactured by Hitachi Chemical Co., Ltd.) was used. To 1,000 g of this resin, NMP as a solvent was added to make a 30 mass % resin solution for use.

Each varnish was coated by dip coating, and a coating amount was adjusted by a die.

On the same copper conductor 1 as in Example 1, the prepared polyamideimide varnish for forming the inner insulating layer was coated, and this was baked at the furnace temperature of 500° C., to form an inner insulating layer 25 having a thickness of 5 µm. Next, the above-prepared foamable polyamideimide varnish was coated on the inner insulating layer 25, and this was baked at the furnace temperature of 580° C., thereby to form the foamed insulating layer 2 having a thickness of 25 µm and a bubble density of 65%.

An insulated wire having the inner insulating layer 25 and the foamed insulating layer 2 formed as mentioned above, was prepared.

The thickness, the bubble density, and the average bubble diameter of each insulating layer of each of the thus-obtained insulated wires, were measured, and further evaluations of the partial discharge inception voltage, the flexibility, the unidirectional abrasion characteristics, and the dielectric breakdown voltage, were conducted as follows.

[Calculation of Bubble Density]

As mentioned above, the insulating film of the insulated wire was cleaved in the thickness direction, while cooling it in liquid nitrogen, and the cross section in the thickness direction was photographed at 300- to 3,000-fold magnification with a scanning electron microscope (SEM). The magnification was adjusted so that the thickness of the whole film can be fitted inside the entire observing screen. The taken SEM photograph of the cross section was retrieved into image analysis software "WinROOF ver.7.1" (a product of Mitani Corporation), by which an area ratio can be calculated. The obtained measurement range was subjected to image analysis, thereby to calculate an area ratio (%). The thus-obtained area ratio (%) was defined as a bubble density (%).

Note that, the terms "top", "middle" and "bottom" in Table 1 shown below, are roughly-divided sections of the bubble density which were judged with the SEM photograph with the naked eye. The bubble density described in each cell of the table is a bubble density in an actual observation range in the observed field of vision.

[Calculation of Thickness of Each Insulating Layer and Average Bubble Diameter]

The thickness of each layer in Examples and Comparative Examples, the thickness of each insulating layer including a foamed insulating layer, and the average bubble diameter in the foamed insulating layer, were measured and calculated, by a scanning electron microscope (SEM) image of the cross section in the thickness direction of the respective insulated wire. The average bubble diameter in the foamed insulating layer, is a value obtained: by selecting randomly 50 bubbles in the respective scanning electron microscope (SEM) image; measuring them in a diameter measurement mode, using an image size measurement software (WinROOF, manufactured by Mitani Corporation); and calculating an average of the measured diameter values, to be the bubble diameter value.

[Partial Discharge Inception Voltage]

The respective test specimen was prepared whose two lengths of insulated wire with respect to each insulated wire produced above were intertwisted into a twisted state. An alternating-current voltage having a 50 Hz sine wave was applied between 2 conductors, and a voltage (effective value), when a discharge charge amount was 10 pC with continuous raise in voltage, was measured. A measurement temperature was set to room temperature. In the measurement of the partial discharge inception voltage, a partial discharge tester (KPD2050, manufactured by Kikusui Electronics Corp.) was used. If the partial discharge inception voltage is 850 V or more, the partial discharge is hardly generated, so that a partial deterioration of the insulated wire can be prevented. For this reason, the obtained partial discharge inception voltage was evaluated in accordance with the following rank.

Evaluation Rank

A: The partial discharge inception voltage is 900 V or more

B: The partial discharge inception voltage is 850 V or more and less than 900 V

C: The partial discharge inception voltage is 500 V or more and less than 850 V

D: The partial discharge inception voltage is less than 500 V

[Flexibility]

The flexibility test was conducted in conformity with JIS C 3216-3. A straight insulated wire was wound in 10 times, alongside of a smooth surface of the round bar having a diameter prescribed in a particular standard so that a wire and a wire would come into contact with each other. The rotational speed of the round bar was set at a ratio between 1 and 3 times per second, and tension was applied so that the wire and the round bar would come into contact with each other. With respect to the prepared test specimen, the existence or the absent of cracks was examined with the naked eye or through 15-fold magnifying glass, and the flexibility was evaluated in accordance with the following rank.

Evaluation Rank

A: No crack is found at all by examining both with the naked eye and through 15-fold magnifying glass B: No crack is found with the naked eye, but slight cracks are found through 15-fold magnifying glass C: A fine defect is observed by a pinhole test prescribed in JIS C 3216-5

D: Cracks are observed with the naked eye

[Unidirectional Abrasion Characteristics]

A unidirectional abrasion test was conducted in conformity with JIS C 3216. As a tester, NEMA scrape tester (Toyo Seiki Seisakusho, Ltd.) was used. This test is conducted in such a manner that with respect to a straight test specimen, a continuously increasing force is applied to a needle, and a surface of the test specimen is kept to be scrubbed with the needle. A force when conduction has occurred between the needle and a conductor, was defined as a destructive force. The obtained results were evaluated in accordance with the following rank.

Evaluation Rank

A: The destructive force is 2,500 g or more

B: The destructive force is 1,500 g or more and less than 2,500 g

C: The destructive force is 1,000 g or more and less than 1,500 g

D: The destructive force is less than 1,000 g

[Dielectric Breakdown Voltage]

Evaluation was conducted in accordance with the following conductive copper foil tape method.

The insulated wire prepared above was cut off to a proper length (about 20 cm length), and a conductive copper foil tape having a width of 20 mm was wound near the center of the insulated wire. An alternating-current voltage having a 50 Hz sine wave was applied between the copper foil and a conductor, and a dielectric breakdown was caused with continuous raise in voltage. The voltage (effective value) was measured. Note that, measurement was performed at 25° C. The results were evaluated in accordance with the following rank.

Evaluation Rank

A: The dielectric breakdown voltage is 10 kV or more

B: The dielectric breakdown voltage is 8 kV or more and less than 10 kV

C: The dielectric breakdown voltage is 5 kV or more and less than 8 kV

D: The dielectric breakdown voltage is less than 5 kV

Note that, regarding the evaluation rank in the above evaluation items, in every rank, C is a minimum of level which should be achieved, and B or higher (i.e. "A") evaluation rank is preferred.

[Overall Evaluation]

The overall evaluation was determined by the number of "A's" in the above 4 items. The case where the number of "A's" was 3 or more was ranked as "A" (excellent), the case where the number of "A's" was 2 was ranked as "B" (good), and the case where the number of "A's" was 1 was ranked as "D" (poor). Further, in the case where the number of "C's" was 2, its overall evaluation was also ranked as "D" (poor). That is, as the overall evaluation, at least "B" or higher rank (i.e. "A") is required.

The obtained results are shown together in the following Table 1.

Further, schematic cross-sectional views in the thickness direction of the insulated wires of Examples 1 to 8 and Comparative Examples 1 to 3, were shown in FIG. 6.

TABLE 1

|  |  |  | Ex 1 | Ex 2 | Ex 3 | Ex 4 | Ex 5 | Ex 6 | Ex 7 | Ex 8 |
|---|---|---|---|---|---|---|---|---|---|---|
| Inner insulating layer (conductor-side insulating layer) | Resin | | PAI | — | PI | PAI | PAI | PAI | PAI | PAI |
| | Thickness (μm) | | 5 | — | 5 | 3 | 5 | 4 | 5 | 5 |
| Formed insulating layer a | Resin | | Foamed PAI | Foamed PI | Foamed PI | Foamed PAI | Foamed PAI | Foamed PAI | Foamed PI | Foamed PI |
| | Thickness (μm) | | 80 | 80 | 50 | 30 | 150 | 40 | 30 | 8 |
| | Bubble density (%) in each measurement range | Top | 15 | 45 | 23 23 23 | 20 | 10 | 70 | 35 | 55 |

TABLE 1-continued

|  |  |  |  |  |  |  |  |  |  |  |
|---|---|---|---|---|---|---|---|---|---|---|
|  |  | Middle | — | — | 23 | — | 40 | 20 | — | — |
|  |  |  |  |  | 23 |  |  |  |  |  |
|  |  |  |  |  | 23 |  |  |  |  |  |
|  |  |  |  |  | 23 |  |  |  |  |  |
|  |  | Bottom (conductor side) | 65 | 50 | 20 | 60 | 70 | 70 | 50 | 15 |
|  |  |  |  |  | 20 |  |  |  |  |  |
|  |  |  |  |  | 20 |  |  |  |  |  |
|  | Difference in bubble density (%) |  | 50 | 5 | 3 | 40 | 60 | 50 | 15 | 40 |
|  | Average bubble diameter (μm) |  | 12 | 10 | 2 | 3 | 3 | 2 | 3 | 3 |
| Formed insulating layer b | Resin |  | — | — | — | Foamed PI | — | — | — | — |
|  | Thickness (μm) |  |  |  |  | 30 |  |  |  |  |
|  | Bubble density (%) in each measurement range | Top |  |  |  | 45 |  |  |  |  |
|  |  | Middle |  |  |  | — |  |  |  |  |
|  |  | Bottom (conductor side) |  |  |  | 55 |  |  |  |  |
|  | Difference in bubble density (%) |  |  |  |  | 10 |  |  |  |  |
|  | Average bubble diameter (μm) |  |  |  |  | 1 |  |  |  |  |
| Outer insulating layer | Resin |  | — | — | — | — | — | PEEK | — | PI |
|  | Thickness (μm) |  | — | — | — | — | — | 30 | — | 25 |
| Total thickness (μm) |  |  | 85 | 80 | 55 | 63 | 155 | 74 | 35 | 38 |
| Partial discharge inception voltage |  |  | A | A | A | A | A | A | A | A |
| Flexibility |  |  | A | A | A | A | A | A | A | A |
| Unidirectional abrasion characteristics |  |  | B | A | A | B | A | A | C | A |
| Dielectric breakdown voltage |  |  | C | B | A | A | A | A | B | B |
| Overall evaluation |  |  | B | A | A | A | A | A | B | A |

Remarks: In the table, 'Ex' means Example according to this invention.

|  |  |  | CEx 1 | CEx 2 | CEx 3 |
|---|---|---|---|---|---|
| Inner insulating layer (conductor-side insulating layer) | Resin |  | PAI | PI | PAI |
|  | Thickness (μm) |  | 3 | 3 | 5 |
| Formed insulating layer a | Resin |  | PI | Foamed PI | Foamed PAI |
|  | Thickness (μm) |  | 30 | 50 | 25 |
|  | Bubble density (%) in each measurement range | Top | — | 70 | 65 |
|  |  |  |  | 70 |  |
|  |  |  |  | 70 | 65 |
|  |  | Middle |  | 70 |  |
|  |  |  |  | 70 | 65 |
|  |  |  |  | 70 |  |
|  |  |  |  | 70 | 65 |
|  |  | Bottom (conductor side) |  | 70 |  |
|  |  |  |  | 70 | 65 |
|  |  |  |  | 70 |  |
|  | Difference in bubble density (%) |  | — | 0 | 0 |
|  | Average bubble diameter (μm) |  | — | 3 | 3 |
| Formed insulating layer b | Resin |  | — | — | — |
|  | Thickness (μm) |  |  |  |  |
|  | Bubble density (%) in each measurement range | Top |  |  |  |
|  |  | Middle |  |  |  |
|  |  | Bottom (conductor side) |  |  |  |
|  | Difference in bubble density (%) |  |  |  |  |
|  | Average bubble diameter (μm) |  |  |  |  |
| Outer insulating layer | Resin |  | — | — | — |
|  | Thickness (μm) |  | — | — | — |
| Total thickness (μm) |  |  | 33 | 53 | 30 |
| Partial discharge inception voltage |  |  | C | A | A |
| Flexibility |  |  | B | B | B |
| Unidirectional abrasion characteristics |  |  | A | C | C |
| Dielectric breakdown voltage |  |  | C | C | C |
| Overall evaluation |  |  | D | D | D |

Remarks: In the table, 'CEx' means Comparative Example.

As is apparent from the above Table 1, each of the insulated wires of Examples 1 to 8, achieves a partial discharge inception voltage of 900 V or more (evaluation rank A), also flexibility of the evaluation rank A, further is excellent in unidirectional abrasion characteristics, and also achieves a high dielectric breakdown voltage of 5 kV or more.

As a result, this was able to satisfy a balance of a high partial discharge inception voltage and an excellent flexibility, which were expected to be difficult to achieve, in the earlier projection.

On the contrary to the above, in Comparative Example 1 which had no foamed insulating layer, a partial discharge inception voltage was conspicuously low. Further, in Comparative Examples 2 and 3, each of which had no difference in bubble density in the thickness direction of the foamed insulating layer, and each of which had a uniform bubble density, although a partial discharge inception voltage was satisfactorily high, the rank of flexibility was conspicuously lower than the insulated wires (Examples 1 to 8) of the present invention.

In addition, in Comparative Example 1 which had no foamed insulating layer, a dielectric breakdown voltage was conspicuously low; and in Comparative Examples 2 and 3, each of a dielectric breakdown voltage and a destructive force in the unidirectional abrasion characteristics was conspicuously low.

In other words, in each of Comparative Examples 1 to 3, the number of rank A's was 1, and further the number of rank C's was 2, and therefore Comparative Examples 1 to 3 each were comprehensively poor.

As described above, the insulated wire of the present invention is applicable to a field which requires resistance to voltage and heat resistance, including automobiles, and, for example, various kinds of electric or electronic equipment. In particular, the insulated wire of the present invention is used for a motor, a transformer, and the like, which can provide high-performance electric or electronic equipment. In particular, the insulated wire is preferably used in a rotating electric machine as a winding wire for a driving motor of HV (hybrid vehicles) and EV (electrical vehicles).

Having described our invention as related to the present embodiments, it is our intention that the invention not be limited by any of the details of the description, unless otherwise specified, but rather be construed broadly within its spirit and scope as set out in the accompanying claims.

This application claims priority on Patent Application No. 2014-227585 filed in Japan on Nov. 7, 2014, which is entirely herein incorporated by reference.

REFERENCE SIGNS LIST 1 conductor
2 foamed insulating layer
3 outer insulating layer
25 inner insulating layer
26 interior insulating layer
35 interior insulating layer

The invention claimed is:

1. An insulated wire, comprising:
   at least one foamed insulating layer composed of a thermosetting resin having bubbles, directly or indirectly on an outer periphery of a conductor,
   wherein the thermosetting resin is selected from a polyamideimide resin, a polyimide resin, a polyamide resin, a polyetherimide resin, a polyesterimide resin, and a polyethersulfone resin,
   wherein the foamed insulating layer has a difference in a bubble density in a thickness direction thereof to be 3% or more, and
   wherein an average bubble diameter of the foamed insulating layer is 10 µm or less.

2. The insulated wire according to claim 1, wherein a difference of the bubble density in the thickness direction of the foamed insulating layer is 3% or more and 90% or less.

3. The insulated wire according to claim 1, wherein an average bubble diameter in the foamed insulating layer is 1 nm or more and 10 µm or less.

4. The insulated wire according to claim 1, wherein a thickness of the foamed insulating layer is from 10 to 200 µm.

5. A rotating electrical machine comprising the insulated wire according to claim 1.

* * * * *